US009892480B2

United States Patent
Rao (10) Patent No.: US 9,892,480 B2
(45) Date of Patent: Feb. 13, 2018

(54) ABORTING GRAPHICS PROCESSOR WORKLOAD EXECUTION

(71) Applicant: Intel Corporation, Santa Clara, CA (US)

(72) Inventor: Jayanth N. Rao, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 287 days.

(21) Appl. No.: 13/929,856

(22) Filed: Jun. 28, 2013

(65) Prior Publication Data

US 2015/0002520 A1    Jan. 1, 2015

(51) Int. Cl.
*G06F 15/80*    (2006.01)
*G06T 1/20*    (2006.01)
*G06F 9/48*    (2006.01)

(52) U.S. Cl.
CPC ............... *G06T 1/20* (2013.01); *G06F 9/485* (2013.01)

(58) Field of Classification Search
CPC ....................................................... G06T 1/20
See application file for complete search history.

(56) References Cited

U.S. PATENT DOCUMENTS

| | | | | |
|---|---|---|---|---|
| 6,894,693 | B1* | 5/2005 | Nash | 345/552 |
| 7,239,322 | B2* | 7/2007 | Lefebvre et al. | 345/522 |
| 7,446,773 | B1* | 11/2008 | Alben et al. | 345/502 |
| 7,466,316 | B1* | 12/2008 | Alben et al. | 345/502 |
| 7,545,381 | B2* | 6/2009 | Huang et al. | 345/522 |
| 7,697,007 | B1* | 4/2010 | Duluk, Jr. | 345/522 |
| 2010/0110083 | A1* | 5/2010 | Paltashev et al. | 345/506 |
| 2012/0194524 | A1* | 8/2012 | Hartog et al. | 345/501 |
| 2013/0155078 | A1* | 6/2013 | Karimian-Kakolaki | 345/520 |

* cited by examiner

*Primary Examiner* — Charles Tseng
(74) *Attorney, Agent, or Firm* — Trop Pruner & Hu, P.C.

(57) ABSTRACT

According to some embodiments, a graphics processor may abort a workload without requiring changes to the kernel code compilation or intruding upon graphics processing unit execution. Instead, it is possible to only read the predicate state once before starting and once before restarting a workload that has been preempted because the user wishes to abort the work. This avoids the need to read from each execution unit, reducing the drain on memory bandwidth and increasing power and performance in some embodiments.

28 Claims, 5 Drawing Sheets

ABORTING GRAPHICS PROCESSOR WORKLOAD EXECUTION

BACKGROUND

This relates generally to graphics processors.

There are times when graphics processors are performing a workload and it is desired to terminate the workload. Existing techniques for terminating graphics processor workloads tend to have a substantial impact on performance. The reason for this is that in order to implement the checks needed to determine whether to abort a workload, reads must be issued from each execution unit. This can result in a relatively large drain on memory bandwidth and can have an adverse impact on power and performance.

WebCL is a new application for graphics processor and multicore central processing unit parallel processing from within a web browser. A typical usage model is that a user opens a web page and the active content on the page is accelerated using the graphics processing unit. However, while the graphics processing unit is busy processing this request, the user may decide to go to a new page. Waiting for the graphics processing unit to complete the work submitted is a waste of limited power and a drain on performance. Therefore, it is desirable to abort the submitted work to the graphics processing unit.

Current graphics processors treat the graphics processing unit as a slave device, meaning that work is submitted to the graphics processing unit by a host driver and the graphics processing unit notifies the host via an interrupt when the job is completed. Generally there is no need in this scenario to abort a job. However, with the advent of WebCL applications, a need arises to support aborting workloads.

More specifically, the current proposals to support aborting workloads require that the graphics processing unit poll a location in memory and when the user modes driver sets a bit at this location, the graphics processing unit exits the kernel. But this adds a read impact performance on all kernels, both aborted and non-aborted kernels. It also impacts the cache utilization and efficiency. All execution unit threads would need to read this one bit resulting in cache serialization. Also the driver has to manage its resource resulting in extra bookkeeping.

BRIEF DESCRIPTION OF THE DRAWINGS

Some embodiments are described with respect to the following figures.

DETAILED DESCRIPTION

According to some embodiments, a graphics processor workload can be aborted without requiring changes to the kernel code compilation or intruding upon graphics processing unit execution. Instead, it is possible to only read the predicate state once before starting and once before restarting a workload that has been preempted because the user wishes to abort the work. This avoids the need to read from each execution unit, reducing the drain on memory bandwidth and increasing power and performance in some embodiments.

In accordance with some embodiments, when a new workload arrives, the user mode drive submits the work to workload queues. Then the user mode driver sets a predicate evaluation to true. The graphics processing unit reads the true predicate and then begins executing the work. Then the user mode driver receives a preemption, for example, because the user no longer wants the graphical depiction that was previously requested. So the user mode driver sets the predicate evaluation to false. This causes the scheduler to resubmit the work. As a result of the work being resubmitted, the graphics processing unit again reads the predicate, but this time the predicate is false and so the graphics processor aborts the workload. Thus, in some embodiments, the workload can be aborted without requiring lots of execution unit reads, thereby reducing the memory utilization and improving performance and power utilization.

A typical use case is that a user, such as an application, visits a web page with active content. The browser, which may be the WebCL client, submits the graphics processor unit workload as needed by the active content in the web page. The user mode driver submits the work to the graphics processing unit. If the graphics processing unit starts to process that work, but that work takes a long time, the user may decide to click on a link that switches to another web page. The job already started is no longer needed. Continuing to run this previously requested, but now undesired workload, adversely impacts performance and power utilization.

So the WebCL client instructs the user-mode driver that it wants to abort the workload.

In one embodiment, a preemption mechanism uses a machine state stored in memory. The graphics processing unit can switch from one context to another. If a long compute workload is being run and some other graphical user interface work is requested, the compute work may be preempted and submitted to the graphical user interface work and then the compute work may be rescheduled. The same preemption mechanism can be used to support an abort.

Another mechanism is called predication. The workload can be conditionally executed based on a predicate state. The state of the predicate is true when the workload is first submitted. When the workload is aborted by the user, the predicate state is reset to false and the workload may be preempted. The scheduler resubmits the workload again, but this time the predicate evaluation results in aborting the work. When the work is aborted, the batch buffer operates as though the work was completed successfully. The operating system is notified that the work was completed as originally planned. The operating system and the kernel mode driver release all resources and continue to operate as usual. The application is aware that the work was aborted and that it should not consume this work, but instead should discard it.

By using predication and preemption, there may be no need to poll an abort command bit during kernel execution. This abort command bit is evaluated as a predicate for the graphics processing unit processing only at the start of each job in one embodiment, when the job is first processed and on resuming after preemption.

In order to preempt work, a workload scheduler such as an operating system forces the preempt request. An OpenCL or WebCL driver builds command buffers for every workload submitted to the graphics processing unit. The command buffers contain graphic processing unit commands needed to execute the work. The GPGPU_WALKER command is a command that actually spawns the execution unit threads that execute the work. The GPGPU_WALKER command can be conditionally executed based on the state of a predicate. This predicate state may be set based on the abort request. If the predicate is true, GPGPU_WALKER spawns as many execution unit threads as are needed to process the request. However, if the predicate state is false, then GPGPU_WALKER does not spawn any execution threads and skips this command and proceeds to the next command in the buffer.

By using predication for all GPGPU_WALKER commands in the command buffer, a graphics processing unit workload can be aborted on resubmission.

Figure 1:
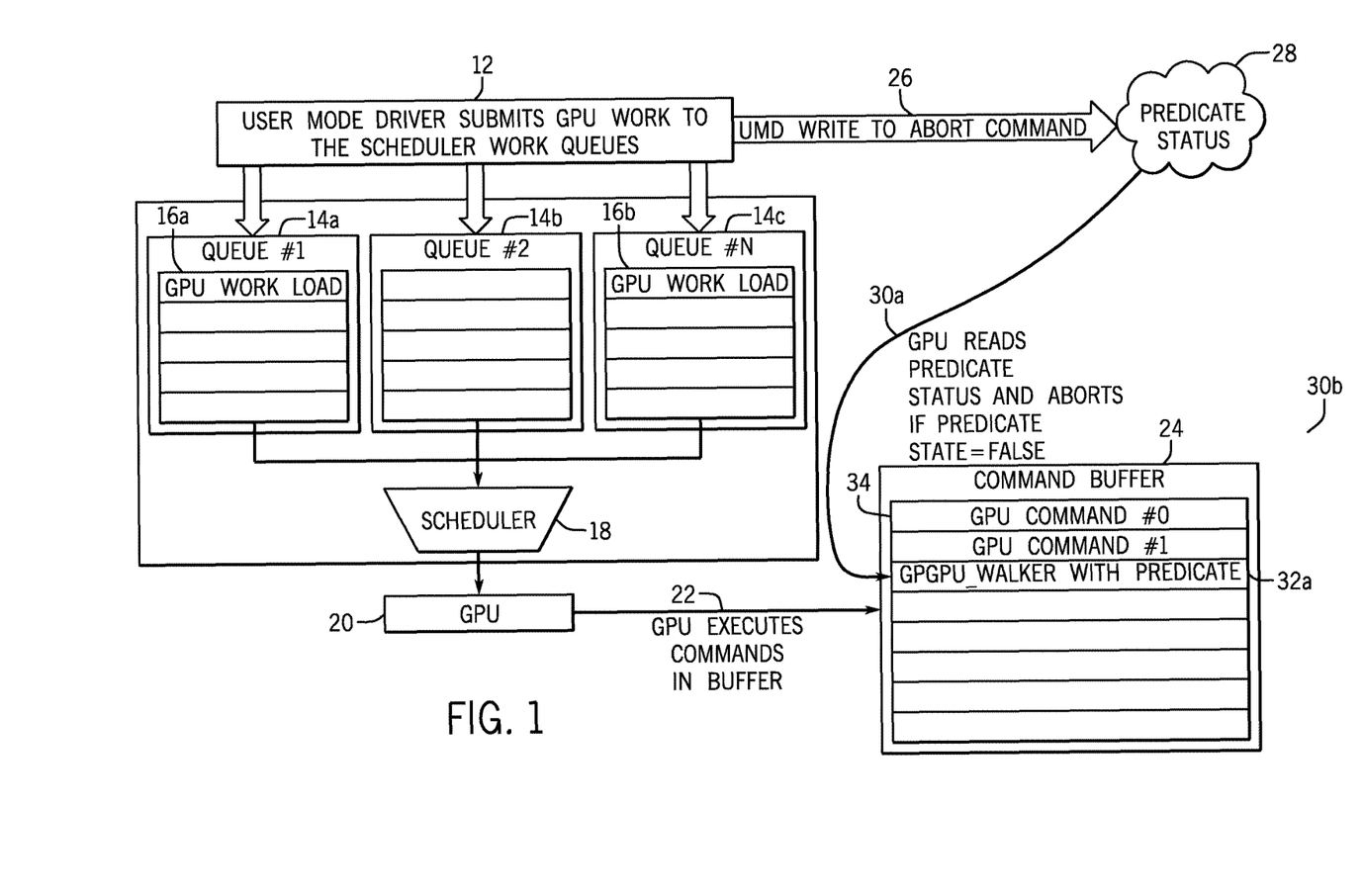
FIG. 1 is a depiction of a WebCL workload abort mechanism according to one embodiment.

Referring to FIG. 1, a user mode driver submits graphics processing unit work to the scheduler 18 via queues 14a-14c as indicated at block 12. Of course there may be many more work queues than those depicted. Thus a queue number 1 (also labeled 14a) has a graphics processing unit workload 16a. The queue number N (also labeled 14c) has a workload 16b.

The queues feed the scheduler 18 which in turn provides workloads to the graphics processing unit 20. Each queue may contain non-WebCL workloads as well as WebCL workloads. The graphics processing unit scheduler may arbitrate workloads across different queues.

The graphics processing unit executes commands in the command buffer 24 as indicated at 22. Thus, the command buffer 24 may have a graphics processing unit command zero, labeled 34, a command one, and a GPGP_WALKER with a predicate 32a as one example.

The user mode driver writes an abort command as indicated in 26 when the user wants to abort the graphics processing unit workload. Thus the abort command is written to a predicate status register 28 in one embodiment. The graphics processing unit reads the predicate status as indicated at arrow 30a and aborts if predicate status is false.

Figure 2:
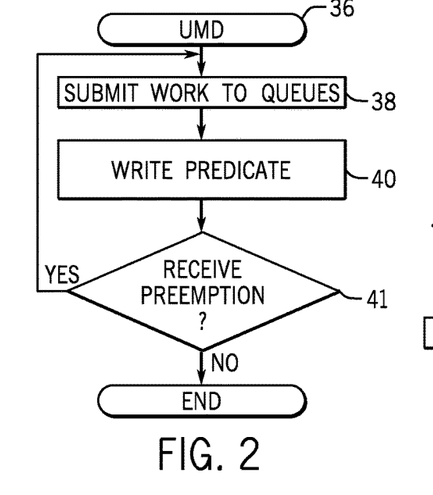
FIG. 2 is a flow chart for a user mode driver sequence according to one embodiment.

Referring to FIG. 2, a sequence for user mode driver 36 may be implemented in software, firmware and/or hardware. In software and firmware embodiments it may be implemented by computer readable instructions stored in more or non-transitory computer readable media such as magnetic, optical or semiconductor storages.

Initially, the sequence submits graphics processing unit workloads to the queues 14 shown in FIG. 1 as indicated in block 38. It also writes the predicate status as indicated in block 40. When a preemption request is received from an application, the workload may be resubmitted as indicated by the yes prong at diamond 41 where the flow may end when there is no preemption request.

Figure 3:
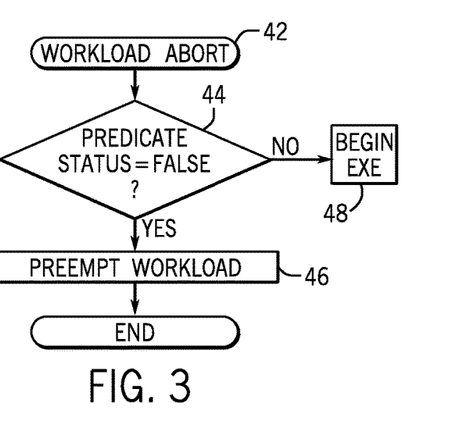
FIG. 3 is a flow chart for a workload abort sequence according to one embodiment.

Referring to FIG. 3, a workload abort sequence 42 may be implemented in software, firmware and/or hardware. In software and firmware embodiments it may be implemented by computer executed instructions stored in one or more non-transitory computer readable media such as magnetic, optical or semiconductor storages.

The sequence 42 begins at diamond 44 with a determination of whether the predicate status is false. If not, execution begins as indicated at block 48.

Otherwise, the workload is preempted as indicated in block 46.

Figure 4:
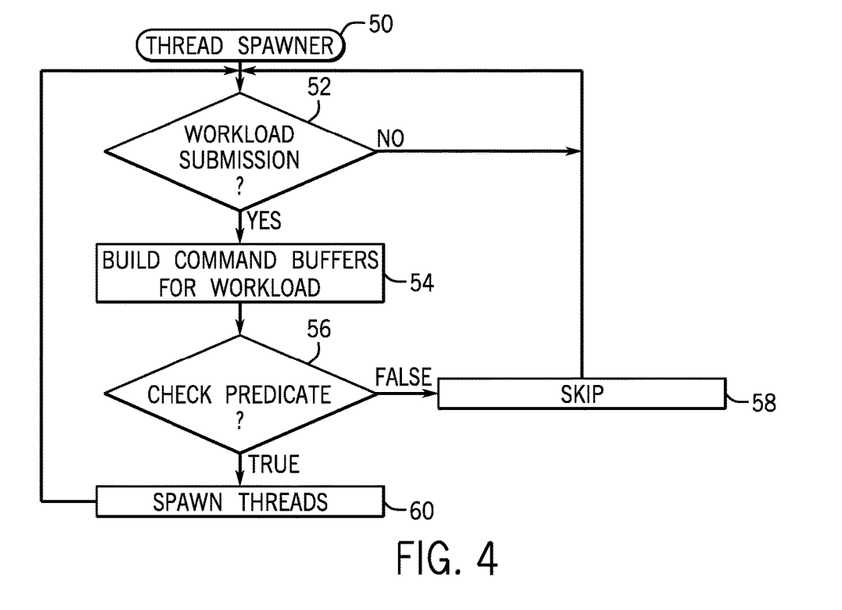
FIG. 4 is a flow chart for a thread spawner sequence according to one embodiment.

Referring to FIG. 4, a thread spawner sequence 50 may be implemented in software, firmware and/or hardware. In software and firmware embodiments it may be implemented by computer executed instructions stored in one or more non-transitory computer readable media such as magnetic, optical or semiconductor storages.

The sequence 50 begins by determining whether a workload has been submitted as indicated at diamond 52. The flow iterates, if not, and otherwise, command buffers are built for each workload as indicated in block 54. A check at diamond 56 determines if the predicate is false. If so, the command is skipped as indicated in block 58 and the flow iterates to the beginning. Otherwise if the predicate is true, the threads are spawned and the work is completed as indicated in block 60.

Figure 5:
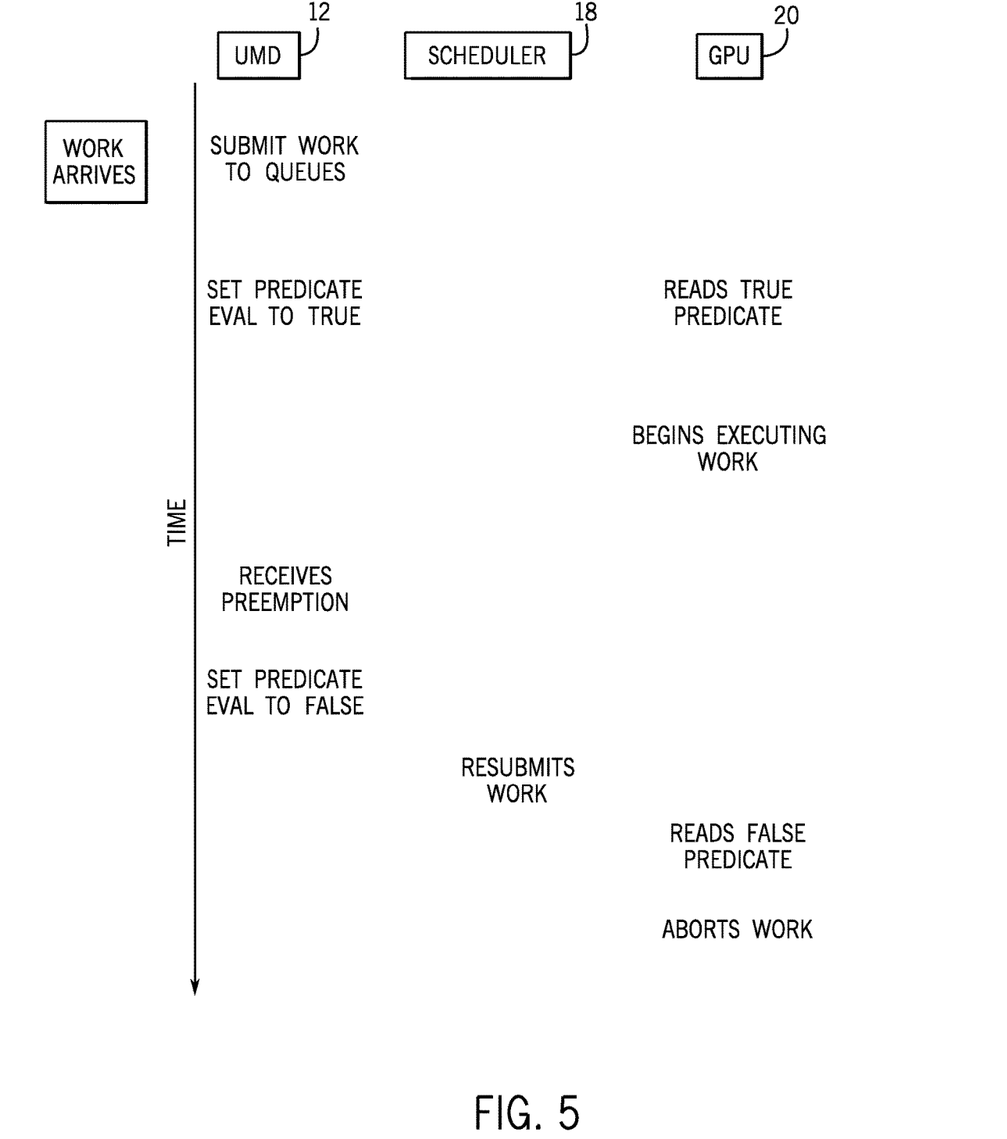
FIG. 5 is a composite flow chart showing interactions between the user mode driver, scheduler and graphics processing unit.

FIG. 5 shows a timeline increasing from top to bottom to illustrate the interaction between the user mode driver 12, the scheduler 18, and the graphics processing unit 20.

When a workload arrives, the user mode drive 12 submits the workload to the queues. That driver sets the predicate evaluation to true. The graphics processing unit 20 reads the true predicate and begins executing the work.

Then the user mode driver receives a preemption as some point thereafter. As a result it sets the predicate evaluation to false. This causes the scheduler to resubmit the same workload. As a result, the graphics processing unit reads the false predicate and aborts the work.

Figure 6:
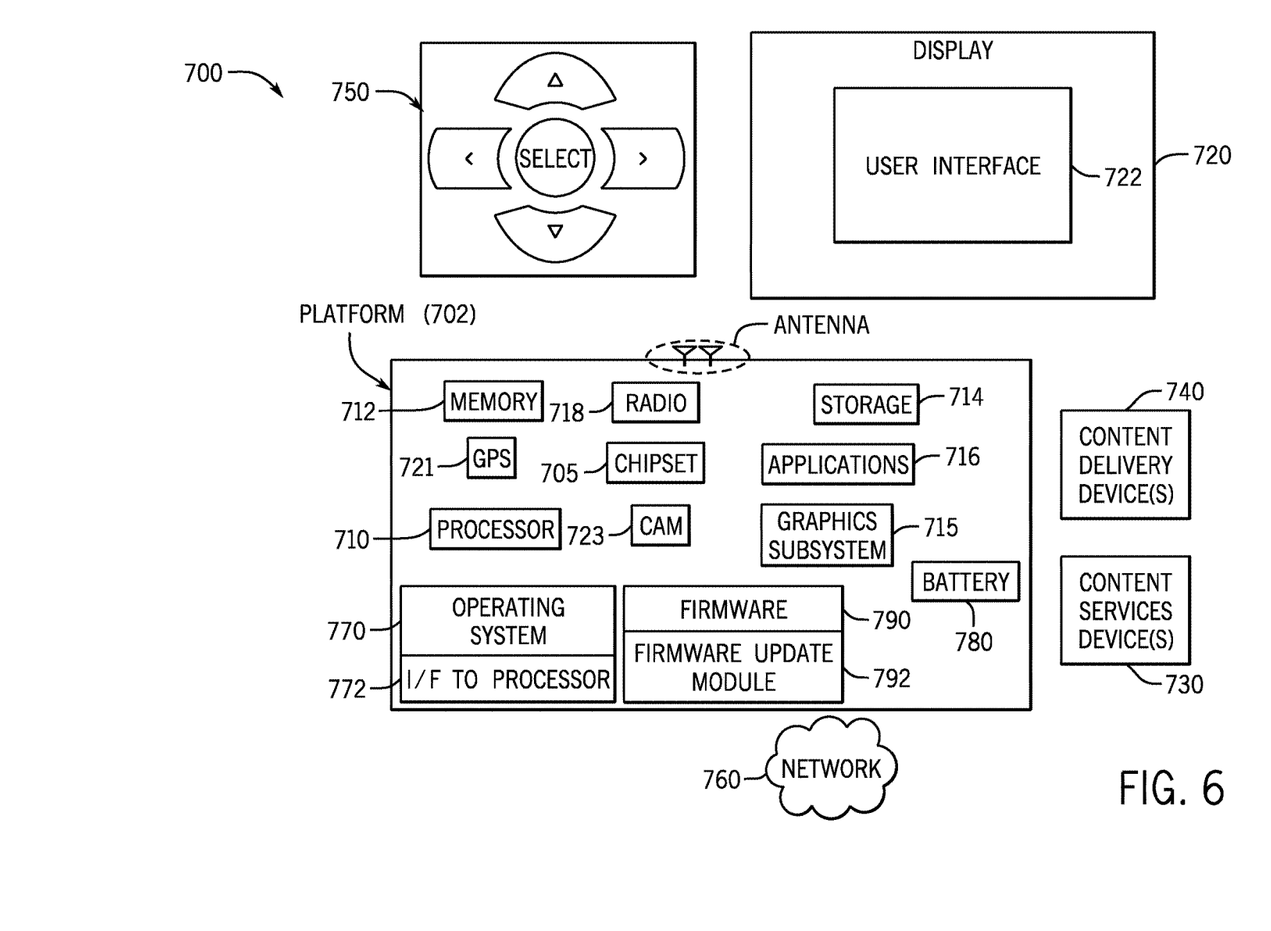
FIG. 6 is a system depiction according to one embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 2 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
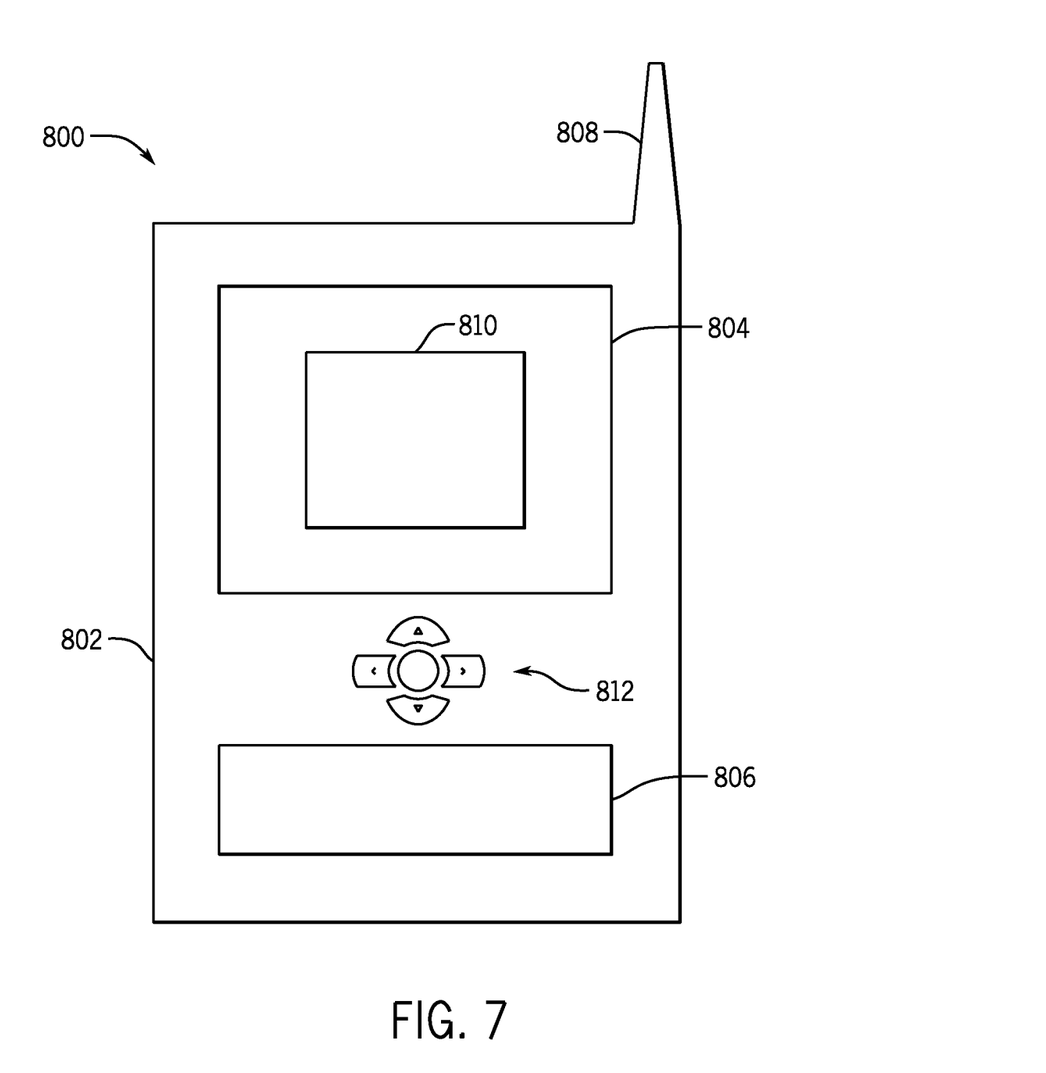
FIG. 7 is a front elevational view for one embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 3 in software and/or firmware embodiments.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising aborting a graphics workload by initiating resubmission of workload to a graphics processing unit. The method may also include enabling a user mode driver to receive a request to abort the workload. The method may also include enabling the driver to change a setting in response to said request. The method may also include wherein the graphics processing unit executes the workload depending on the setting. The method may also include changing the setting while the workload is executing, resulting in resubmission of the workload. The method may also include enabling said graphics processing unit to abort the workload after resubmission in response to the setting change. The method may also include enabling the graphics processing unit to read the setting only once on each submission of a workload. The method may also include enabling the user mode driver to set the setting to a state to enable execution the first time it receives the workload and to change the setting in response to the request to abort. The method may also include wherein the request to abort is a preemption request.

In another example embodiment one or more non-transitory computer readable media storing instructions that may be executed to cause a processor to perform a sequence comprising aborting a graphics workload by initiating resubmission of workload to a graphics processing unit. The media may further store said sequence including enabling a user mode driver to receive a request to abort the workload. The media may further store said sequence including enabling the driver to change a setting in response to said request. The media may further store said sequence wherein the graphics processing unit executes the workload depending on the setting. The media may further store said sequence including changing the setting while the workload is executing, resulting in resubmission of the workload. The media may further store said sequence including enabling said graphics processing unit to abort the workload after resubmission in response to the setting change. The media may further store said sequence including enabling the graphics processing unit to read the setting only once on each submission of a workload. The media may further store said sequence including enabling the user mode driver to set the setting to a state to enable execution the first time it receives the workload and to change the setting in response to the request to abort. The media may further store wherein the request to abort is a preemption request.

Another example embodiment may be an apparatus comprising a user mode driver to submit workload and a set a state for the workload, receive a preemption request and change the state in response to the preemption request, a graphics processing unit to read the state, execute the workload and abort the work in response to the state change, and a scheduler to resubmit workload in response to the state change. The apparatus may include wherein said user mode driver to receive a preemption request in the form of a request to abort the workload. The apparatus may include wherein said graphics processing unit to execute the workload depending on the state. The apparatus may include said user mode driver to change the state while the workload is executing, resulting in resubmission of the workload. The apparatus may include said graphics processing unit to abort the workload after resubmission in response to the change in state. The apparatus may include said graphics processing unit to read the state only once on each submission of a workload. The apparatus may include the user mode driver to set the state to enable execution the first time the user mode driver receives a workload and to change the state in response to a request to abort. The apparatus may include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   building a command buffer to store a first command to spawn threads to execute graphics workloads and other commands, said first command to have a predicate status;
   submitting a graphics workload to a workload queue of a graphics processor for execution by the graphics processor and setting a first predicate state of said first command;
   in response to a pre-emption request, resetting the predicate status of the first command to a second predicate state;
   resubmitting the workload to the workload queue;
   checking the predicate status of the first command; and
   aborting the graphics workload solely in response to said resubmitting the workload to the workload queue again with said predicate status of the first command in said second predicate state.

2. The method of claim 1 including enabling a user mode driver to receive a request to abort the workload.

3. The method of claim 2 including enabling the driver to change a setting in response to said request.

4. The method of claim 3 wherein the graphics processing unit executes the workload depending on the setting.

5. The method of claim 4 including changing the setting while the workload is executing, resulting in resubmission of the workload.

6. The method of claim 5 including enabling said graphics processing unit to abort the workload after resubmission in response to the setting change.

7. The method of claim 6 including enabling the graphics processing unit to read the setting only once on each submission of a workload.

8. The method of claim 3 including enabling the user mode driver to set the setting to a state to enable execution the first time it receives the workload and to change the setting in response to the request to abort.

9. The method of claim 8 wherein the request to abort is a preemption request.

10. One or more non-transitory computer readable media storing instructions that may be executed to cause a processor to perform a sequence comprising:
    building a command buffer to store a first command to spawn threads to execute graphics workloads and other commands, said first command to have a predicate status;
    submitting a graphics workload to a workload queue of a graphics processor for execution by the graphics processor and setting a first predicate state of said first command;
    in response to a pre-emption request, resetting the predicate status of the first command to a second predicate state;
    resubmitting the workload to the workload queue;
    checking the predicate status of the first command; and aborting the graphics workload solely in response to said resubmitting the workload to the workload queue again with said predicate status of the first command in said second predicate state.

11. The media of claim 10, said sequence including enabling a user mode driver to receive a request to abort the workload.

12. The media of claim 11, said sequence including enabling the driver to change a setting in response to said request.

13. The media of claim 12, said sequence wherein the graphics processing unit executes the workload depending on the setting.

14. The media of claim 13, said sequence including changing the setting while the workload is executing, resulting in resubmission of the workload.

15. The media of claim 14, said sequence including enabling said graphics processing unit to abort the workload after resubmission in response to the setting change.

16. The media of claim 15, said sequence including enabling the graphics processing unit to read the setting only once on each submission of a workload.

17. The media of claim 12, said sequence including enabling the user mode driver to set the setting to a state to enable execution the first time it receives the workload and to change the setting in response to the request to abort.

18. The media of claim 17, wherein the request to abort is a preemption request.

19. An apparatus comprising:
a user mode driver to build a command buffer to store a first command to spawn threads to execute graphics workloads and other commands, said first command to have a predicate status, submit a graphics workload to a workload queue of a graphics processing unit for execution by the graphics processor and set a first predicate state of said first command, in response to a pre-emption request, resetting the predicate status of the first command to a second predicate state, resubmit the workload to the workload queue, check the predicate status of the first command, and abort the graphics workload solely in response to said resubmitting the workload to the workload queue again with said predicate status of the first command in said second predicate state; and
a scheduler to resubmit the workload in response to the status change.

20. The apparatus of claim 19 wherein said user mode driver to receive a preemption request in the form of a request to abort the workload.

21. The apparatus of claim 19 wherein said graphics processing unit to execute the workload depending on the status.

22. The apparatus of claim 21, said user mode driver to change the status while the workload is executing, resulting in resubmission of the workload.

23. The apparatus of claim 22, said graphics processing unit to abort the workload after resubmission in response to the change in the status.

24. The apparatus of claim 23, said graphics processing unit to read the status only once on each submission of a workload.

25. The apparatus of claim 19, the user mode driver to set the status to enable execution the first time the user mode driver receives a workload and to change the status in response to a request to abort.

26. The apparatus of claim 19 including an operating system.

27. The apparatus of claim 19 including a battery.

28. The apparatus of claim 19 including firmware and a module to update said firmware.

* * * * *